Figure 1:
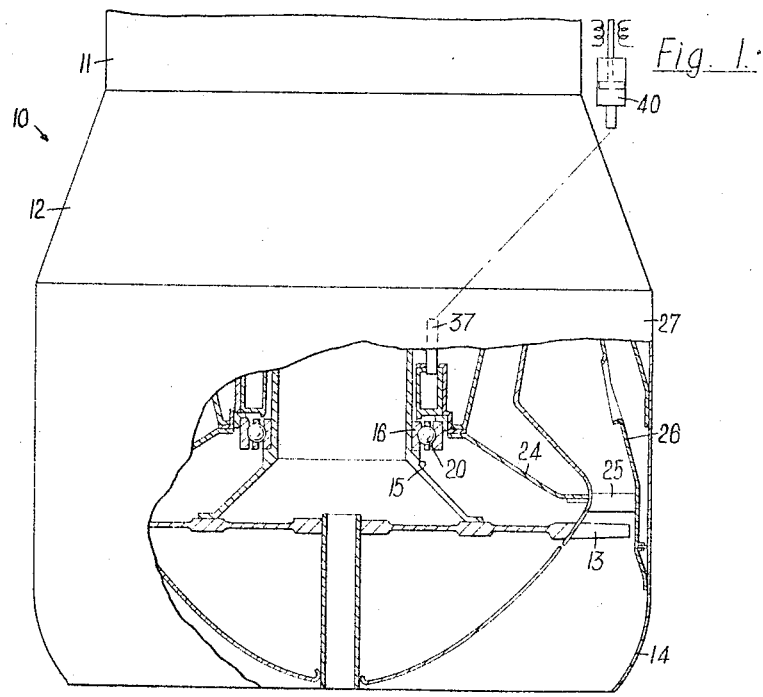

Aug. 23, 1966  L. J. PRATT ETAL  3,268,277

BEARING ASSEMBLY

Filed Feb. 6, 1964  2 Sheets-Sheet 1

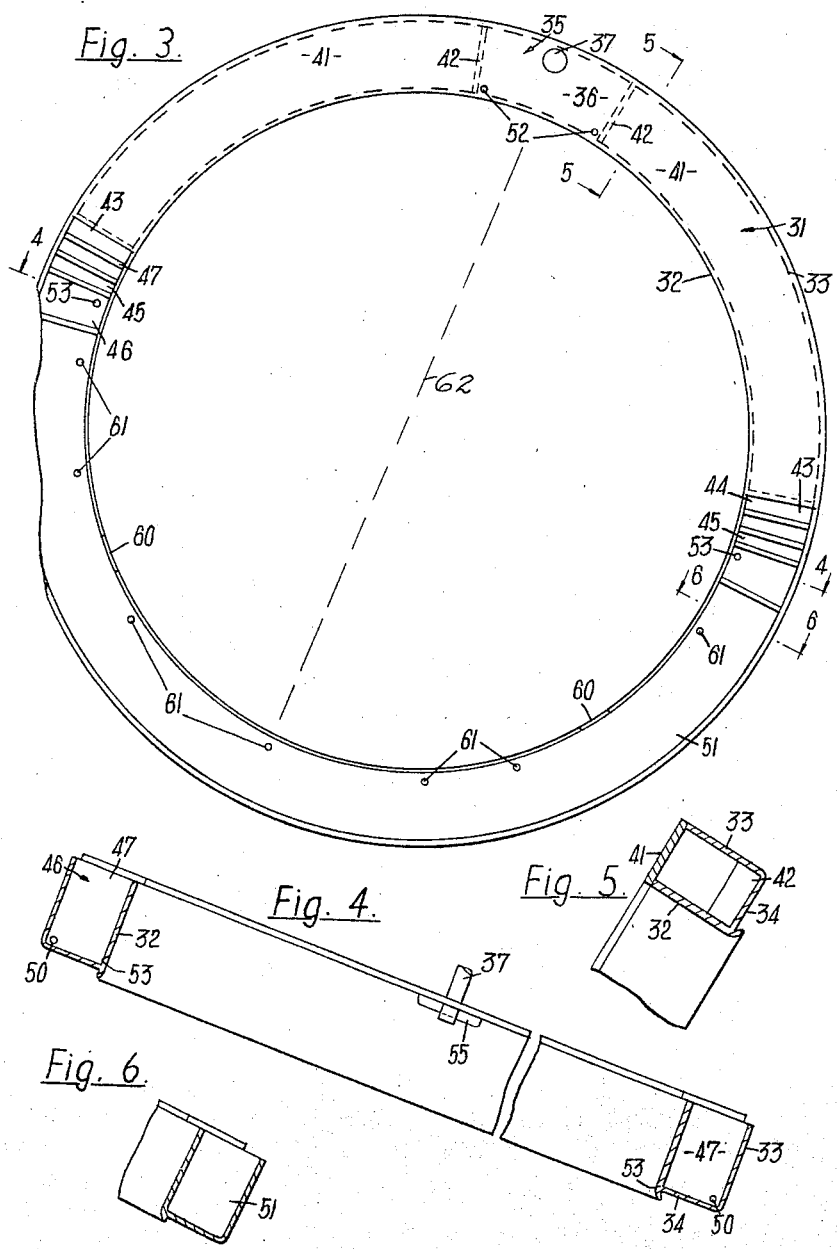

United States Patent Office 3,268,277
Patented August 23, 1966

3,268,277
BEARING ASSEMBLY
Leslie James Pratt, Ronald Brien and James Robert Cross, Derby, England, assignors to Rolls-Royce Limited, Derby, England, a company of Great Britain
Filed Feb. 6, 1964, Ser. No. 342,896
Claims priority, application Great Britain, Sept. 2, 1963, 34,650/63
10 Claims. (Cl. 308—121)

This invention concerns a bearing assembly.

Although the invention is not so restricted, it is more particularly concerned with a bearing assembly for use in a gas turbine vertical lift engine, the term "vertical lift engine" as used in this specification being intended to indicate an engine which is adapted to produce vertical lift forces on an aircraft independently of those generated aerodynamically by forward flight of the aircraft.

A vertical lift engine will only be operated for short periods since it will only be operated during take-off and landing of the aircraft. The engine may therefore be satisfactorily lubricated by supplying the engine bearings with a quantity of lubricant which is only just sufficient to last throughout such a period. If this, however, is done, it is important to ensure that some of the said quantity of lubricant will pass to the bearing immediately the engine is started and it is also important to ensure that the whole of the said quantity of lubricant does not pass to the bearing immediately the engine is started. The object of the present invention is therefore to provide a bearing assembly which shall be satisfactory in this respect.

According therefore to the present invention, there is provided a bearing assembly comprising a bearing, a lubricant chamber having a plurality of compartments therein at least two of which have at least one aperture in a wall thereof through which lubricant may pass from the compartment to the bearing, a lubricant inlet duct through which a single shot of lubricant may be supplied to one only of said compartments, and means affording restricted communication between the said one compartment and the other compartment or compartments so that, in operation, the bearing is first supplied with lubricant from the said one compartment only and is thereafter supplied with lubricant which has passed from the said one compartment to the said other compartment or compartments.

Preferably there are at least one series of the said other compartments which are arranged to communicate with each other in turn, one compartment only of the or each said series communicating directly with the said one compartment.

The said restricted communication is preferably such that the or each of said other compartment does not supply lubricant to the bearing until at least the greater part of the lubricant in the compartment upstream of it has been supplied to the bearing.

The said one compartment may have one part which communicates directly with the said lubricant inlet duct and at least one other part which is separated from the said one part by a weir and which has restricted communication with the next adjacent compartment.

At least two of the said compartments may be separated from each other by an apertured wall member.

Preferably, the lubricant chamber is at least part annular, there being two series of the said other compartments which are arranged to communicate with each other in turn, the said one compartment being disposed between and communicating with one compartment only of each said series. The arrangement is preferably such that the bearing assembly may, in operation, tilt about at least one axis without the lubricant supply to the bearing being interrupted.

The said one compartment preferably has a vent through which may pass air and/or excess lubricant supplied to the said one compartment, means being provided for supplying at least part of the excess lubricant which has passed through said vent to the bearing over an extended period.

A shaft may be mounted in said bearing and spaced from the annular lubricant chamber by an annular space with which the said vent communicates, the said annular space also communicating with a further compartment of said annular lubricant chamber, which further compartment has apertures through which lubricant may pass to the bearing whereby, in operation, centrifugal forces cause excess lubricant which has entered said annular space to pass to the said further compartment and so to the bearing.

The invention also comprises a gas turbine vertical lift engine having a thrust to weight raito of at least 12:1, the said engine being provided with at least one bearing assembly as set forth above.

Figure 2:
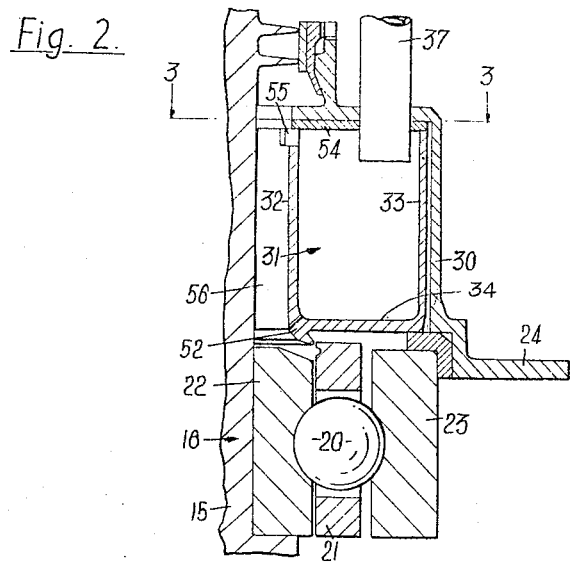

The invention is illustrated, merely by way of example, in the accompanying drawings, in which:

FIGURE 1 is an elevation partly, in section, of a gas turbine vertical lift engine provided with a bearing assembly according to the present invention, FIGURE 2 is a broken away section showing part of the structure of FIGURE 1 on a larger scale, FIGURE 3 is a section taken on the line 3—3 of FIGURE 2, and FIGURES 4, 5 and 6 are sections taken respectively on the lines 4—4, 5—5 and 6—6 of FIGURE 3.

Referring to the drawings, a gas turbine vertical lift engine 10 has a thrust to weight ratio of at least 12:1 and may have a thrust to weight ratio of the order of 16:1. The engine 10 comprises a compressor 11, combustion equipment 12 and a turbine 13, the turbine exhaust gases being directed to atmosphere through a short exhaust duct 14. The compressor 11 and turbine 13 are mounted on a common shaft 15.

The lower end of the shaft 15 is rotatably mounted in a ball bearing 16. The ball bearing 16 comprises balls 20 which are retained in a cage 21, the balls 20 being disposed between and in rolling contact with an inner race 22 and an outer race 23. The inner race 22 is secured to the shaft 15, the outer race 23 being secured to wall structure 24 which is itself secured, by means including struts 25 and an inner casing 26, to the engine casing 27.

The wall structure 24 has an annular, inverted L-shaped, portion 30 within which is mounted an annular lubricant chamber 31. The lubricant chamber 31 has an inner wall 32, an outer wall 33 and a base 34. The lubricant chamber 31 has a compartment 35 which constitutes rather more than one-third of the lubricant chamber 31 and which has a central portion 36 which communicates with a lubricant inlet duct 37. A pump mechanism 40 (which may, for example, be as described in our U.S. Patent No. 3,154,919), is provided to force a single shot of a predetermined quantity of lubricant through the lubricant inlet duct 37 and into the central portion 36 of the compartment 35.

The central portion 36 of the compartment 35 is disposed between two outer portions 41 thereof from which it is separated by weirs 42.

The lubricant chamber 31 is divided into a number of other compartments 43, 44, 45, 46 by radially extending wall members 47. Each wall member 47 is provided with an aperture 50 through which restricted communication can occur between adjacent compartments. Apart however, from any flow through the apertures 50, the wall members 47 serve to divide each compartment from its adjacent compartments.

As will be seen from FIGURE 3, the compartment 35 is disposed between two series of compartments 43–46, the compartment 35 communicating directly only with the compartments 43, and the compartments 43–46 communicating with each other in turn. The two compartments 46 are disposed at opposite ends of a further compartment 51 of the lubricant chamber 31.

The central portion 36 of the compartment 35 is provided at its base 34 with two apertures 52 through which lubricant from the central portion 36 may flow, such lubricant passing between the inner race 22 and the cage 21 and so to the balls 20. From there, the lubricant may either pass outwardly of the bearing 16 and so overboard, or may be re-circulated around the bearing 16.

The base 34 of each of the compartments 46 is provided with at least one aperture 53 through which lubricant may pass from the respective compartment 46 to the bearing 16.

A cover plate 54 extends above the compartments 35, and 41, the remaining compartments 43–46 and 51 having their upper end open. As will be seen from FIGURE 2, a vent 55 is provided between the cover plate 54 and the wall 32 of the central portion 36 of the compartment 35. Any lubricant passing out of the central portion 36 through the vent 55 may enter an annular space 56 which is formed between the wall 32 and the shaft 15.

The compartment 51 has apertures 60 in its wall 32 through which lubricant from the annular space 56 may enter the compartment 51. The compartment 51 also has apertures 61 in its base 34 through which lubricant may pass from the compartment to the bearing 16.

In operation, when the engine 10 is started, the pump mechanism 40 forces a single shot of lubricant through the lubricant inlet duct 37 and into the central portion 36 of the compartment 35. A small proportion (e.g. one-sixth) of this shot of lubricant will be retained by the weirs 42 within the central portion 36 of the compartment 35, but the greater part of this shot will pass over the weirs 42 into the outer portions 41 of the compartment 35. The lubricant retained by the weirs 42 within the central portion 36 will, however, immediately start to flow through the apertures 52 to the bearing 16. The apertures 52 are, however, so small that only a metered flow of lubricant will pass out through them.

The lubricant which has passed over the weirs 42 and into the said outer portions 41 will pass through the apertures 50 of the respective wall members 47 and so through compartments 43, 44, 45 into the two compartments 46. It will be appreciated, however, that it will take some time for the lubricant to flow through the outer portions 41, through the apertures 50 of the respective wall members 47, and through the apertures 53 of the compartments 46. It will therefore be some time before the bearing 16 is supplied with lubricant from the compartments 46 and it is arranged that the greater part of the lubricant in the central portion 36 has been supplied to the bearing 16 before the latter receives any supply of lubricant from the compartments 46.

It will be appreciated that if, in operation, the engine 10 should be tilted about an axis 62, one or other of the weirs 42, one or other of the apertures 52, and one or other of the apertures 53 in each of the compartments 43–46 will be below the level of the lubricant, whereby lubricant will continue to be supplied to the bearing 16.

It will also be appreciated that in the arrangement of the present invention, some lubricant will be supplied to the bearing 16 immediately the engine is brought into operation, but that not all of the lubricant will be supplied to the bearing 16 at this moment.

If a false start should be made, that is to say if two successive attempts are made to start the engine 10, two shots of lubricant may be supplied to the central portion 36 of the compartment 35. This will cause flooding of the central portion 36, the excess lubricant passing out through the vent 55 and into the annular space 56. Centrifugal forces will then cause this excess lubricant in the annular space 56 to travel around the wall 32 and so to pass through the apertures 60 and into the compartment 51. This excess lubricant will then, over an extended period, pass to the bearing 16 by way of the apertures 61.

It will be appreciated that by suitably dimensioning the diameter of the apertures 50, the flow of oil through the compartments 41, 43, 44, 46 to the apertures 53 can be conveniently varied.

We claim:

1. A bearing assembly comprising a bearing, a lubricant chamber having a plurality of compartments therein at least two of which have at least one aperture therein through which lubricant may pass from the compartment to the bearing, a lubricant inlet duct through which a single shot of lubricant may be supplied to one only of said compartments, and means affording restricted communication between the said one compartment and any other compartments, said means ensuring that the bearing is first supplied with lubricant from the said one compartment only and is thereafter supplied with lubricant which has passed from the said one compartment to the said any other compartments.

2. A bearing assembly comprising a bearing, a lubricant chamber having a series of compartments therein at least two of which have at least one aperture therein through which lubricant may pass from the compartment to the bearing, a lubricant inlet duct through which a single shot of lubricant may be supplied to one only of said compartments, at least one series of other compartments in said lubricant chamber which are arranged to communicate with each other in turn, and means affording restricted communication between the said one compartment and one only of the said series of other compartments, said means ensuring that the bearing is first supplied with lubricant from the said one compartment only and is thereafter supplied with lubricant which has passed from the said one compartment to the said series of other compartments.

3. A bearing assembly comprising a bearing, a lubricant chamber having a series of compartments therein at least two of which have at least one aperture therein through which lubricant may pass from the compartment to the bearing, a lubricant inlet duct through which a single shot of lubricant may be supplied to one only of said compartments, at least one series of other compartments in said lubricant chamber which are arranged to communicate with each other in turn, and means affording restricted communication between the said one compartment and one only of the said series of other compartments, said means ensuring that the bearing is first supplied with lubricant from the said one compartment only and is thereafter supplied with lubricant which has passed from the said one compartment to the said series of other compartments each said other compartment being prevented by said means from supplying lubricant to the bearing until at least the greater part of the lubricant in the compartment upstream of it has been supplied to the bearing.

4. A bearing assembly comprising a bearing, a lubricant chamber having a plurality of compartments therein each of which has at least one aperture therein through which lubricant may pass from the compartment to the bearing, a lubricant inlet duct through which a single shot of lubricant may be supplied to one only of said compartments, the said one compartment having at least two parts one of which communicates directly with the said lubricant inlet duct, weir means separating the said one part from at least one other part of the said one compartment, and means affording restricted communication between any said other part and the next adjacent compartment, whereby the bearing is first supplied with lubricant from the said one compartment only and is thereafter supplied with lubricant which has passed from the said one compartment to any said other compartment.

5. A bearing assembly comprising a bearing, a lubricant chamber having a plurality of compartments therein each of which has at least one aperture therein through which lubricant may pass from the compartment to the bearing, a lubricant inlet duct through which a single shot of lubricant may be supplied to one only of said compartments, the said one compartment having at least two parts one of which communicates directly with the said lubricant inlet duct, weir means separating the said one part from at least one other part and an apertured wall member between any said other part and the next adjacent compartment, whereby the bearing is first supplied with lubricant from the said one compartment only and is thereafter supplied with lubricant which has passed from the said one compartment to any said other compartment.

6. A bearing assembly comprising a bearing, an at least part-annular lubricant chamber having a central compartment and two series of other compartments which communicate with each other in turn between which the central compartment is disposed, each compartment having at least one aperture therein through which lubricant may pass from the respective compartment to the bearing, a lubricant inlet duct through which a single shot of lubricant may be supplied to the central compartment, the central compartment communicating with one compartment only of each said series, and means affording restricted communication between adjacent compartments, whereby the bearing is first supplied with lubricant from the said central compartment only and is thereafter supplied with lubricant which has passed from the said central compartment to the said other compartments.

7. A bearing assembly comprising a bearing, an at least part-annular lubricant chamber having a central compartment and two series of other compartments which communicate with each other in turn and between which the central compartment is disposed, each compartment having at least one aperture therein through which lubricant may pass from the respective compartment to the bearing, a lubricant inlet duct through which a single shot of lubricant may be supplied to the central compartment, the central compartment communicating with one compartment only of each said series, and means affording restricted communication between adjacent compartments, whereby the bearing is first supplied with lubricant from the said central compartment only and is thereafter supplied with lubricant which has passed from the said central compartment to the said other compartments, said central compartment having a vent through which may pass excess lubricant supplied to the said central compartment, and means for supplying at least part of the excess lubricant which has passed through said vent to the bearing over an extended period.

8. A bearing assembly comprising a bearing, an at least part-annular lubricant chamber, a shaft invented in said bearing and spaced from the lubricant chamber by an annular space, the lubricant chamber having a central compartment, two series of other compartments which communicate with each other in turn and between which the central compartment is disposed and a further compartment which communicates with the annular space, each compartment having at least one aperture therein through which lubricant may pass from the respective compartment to the bearing, a lubricant inlet duct through which a single shot of lubricant may be supplied to the central compartment, the central compartment communicating with one compartment only of each said series, means affording restricted communication between adjacent compartments and means providing a vent in the central compartment through which excess lubricant may pass to the annular space, centrifugal forces causing excess lubricant which has entered said annular space to pass to the said further compartment, the bearing being first supplied with lubricant from the said central compartment only and being thereafter supplied with lubricant which has passed from the said central compartment to the other compartments.

9. In a gas turbine vertical lift engine having a thrust to weight ratio of at least 12:1, a bearing assembly comprising a bearing, a lubricant chamber having a plurality of compartments therein at least two of which have at least one aperture therein through which lubricant may pass from the compartment to the bearing, a lubricant inlet duct through which a single shot of lubricant may be supplied to one only of said compartments, and means affording restricted communication between the said one compartment and any other compartments, said means ensuring that the bearing is first supplied with lubricant from the said one compartment only and is thereafter supplied with lubricant which has passed from the said one compartment to the said any other compartments in claim 1.

10. A bearing assembly comprising a bearing, a lubricant chamber adapted to be supplied with lubricant, a plurality of lubricant outlet ducts through each of which lubricant may pass from the lubricant chamber to the bearing, and means providing at least one selected lubricant outlet duct with restricted communication with the lubricant chamber while at least one other lubricant outlet duct communicates substantially more freely with the lubricant chamber, the said means ensuring that the bearing is first supplied with lubricant only via the said at least one other lubricant outlet duct and is thereafter supplied with lubricant via the said at least one selected lubricant outlet duct.

References Cited by the Examiner
UNITED STATES PATENTS
3,154,919  11/1964  Keen et al. _____ 60—39.08

DAVID J. WILLIAMOWSKY, *Primary Examiner.*

FRANK SUSKO, *Examiner.*